US012458558B2

(12) United States Patent
Kappl et al.

(10) Patent No.: US 12,458,558 B2
(45) Date of Patent: Nov. 4, 2025

(54) ADAPTIVE ROLLING WALKING DEVICE WITH SENSOR DATA ACQUISITION

(71) Applicant: Conixus Patentverwaltungs UG, Schechen (DE)

(72) Inventors: Simon Kappl, Rosenheim (DE); Matthias Fuchs, Waldkraiburg (DE); Michael Mayer, Wasserburg a. Inn (DE); Nikolaus Wittko, Schechen (DE); Sebastian Griesser, Schechen (DE); Theresa Hauser, Reit im Winkel (DE); Uwe Nowak, Schechen (DE)

(73) Assignee: Conixus Patentverwaltungs UG, Schechen (DE)

( * ) Notice: Subject to any disclaimer, the term of this patent is extended or adjusted under 35 U.S.C. 154(b) by 80 days.

(21) Appl. No.: 18/096,891

(22) Filed: Jan. 13, 2023

(65) Prior Publication Data

US 2023/0240933 A1 Aug. 3, 2023

(30) Foreign Application Priority Data

Jan. 14, 2022 (EP) .................................... 22151611

(51) Int. Cl.
*A61H 3/04* (2006.01)

(52) U.S. Cl.
CPC ........... *A61H 3/04* (2013.01); *A61H 2201/10* (2013.01); *A61H 2201/1619* (2013.01); *A61H 2201/5058* (2013.01)

(58) Field of Classification Search
CPC ................ A61H 3/04; A61H 2003/043; A61H 2003/046; A61H 2201/0169
See application file for complete search history.

(56) References Cited

U.S. PATENT DOCUMENTS

| | | | | |
|---|---|---|---|---|
| 3,165,314 A * | 1/1965 | Clearman | A61H 3/04 | 5/81.1 R |
| 4,798,395 A * | 1/1989 | Shaffer | B62M 1/14 | 280/282 |
| 5,732,964 A | 3/1998 | Durham et al. | | |
| 6,036,210 A * | 3/2000 | Lee | B62K 5/023 | 280/282 |
| 6,439,250 B1 * | 8/2002 | Balan | A61H 3/008 | 280/87.041 |

(Continued)

FOREIGN PATENT DOCUMENTS

| | | |
|---|---|---|
| FR | 3027514 A1 | 4/2016 |
| JP | 2001202590 A | 7/2001 |

(Continued)

*Primary Examiner* — Noah Chandler Hawk
(74) *Attorney, Agent, or Firm* — Kowert, Hood, Munyon, Rankin & Goetzel, P.C.; Jeffrey C. Hood; Luke Langsjoen

(57) ABSTRACT

The present disclosure relates to a rolling walking device for the therapy and diagnosis of a person with a motor restriction. The walking device comprises at least one axis and a plurality of wheels, a support device for the person, which is configured such that the person can sit on the support device while using the walking device and simultaneously rest with the front of their upper body, and, optionally, with the head, at least partially on the support device, and one or more sensors configured to generate sensor data associated with a therapeutic interaction of the person with the walking device.

14 Claims, 6 Drawing Sheets

(56) References Cited

U.S. PATENT DOCUMENTS

Figure 1:
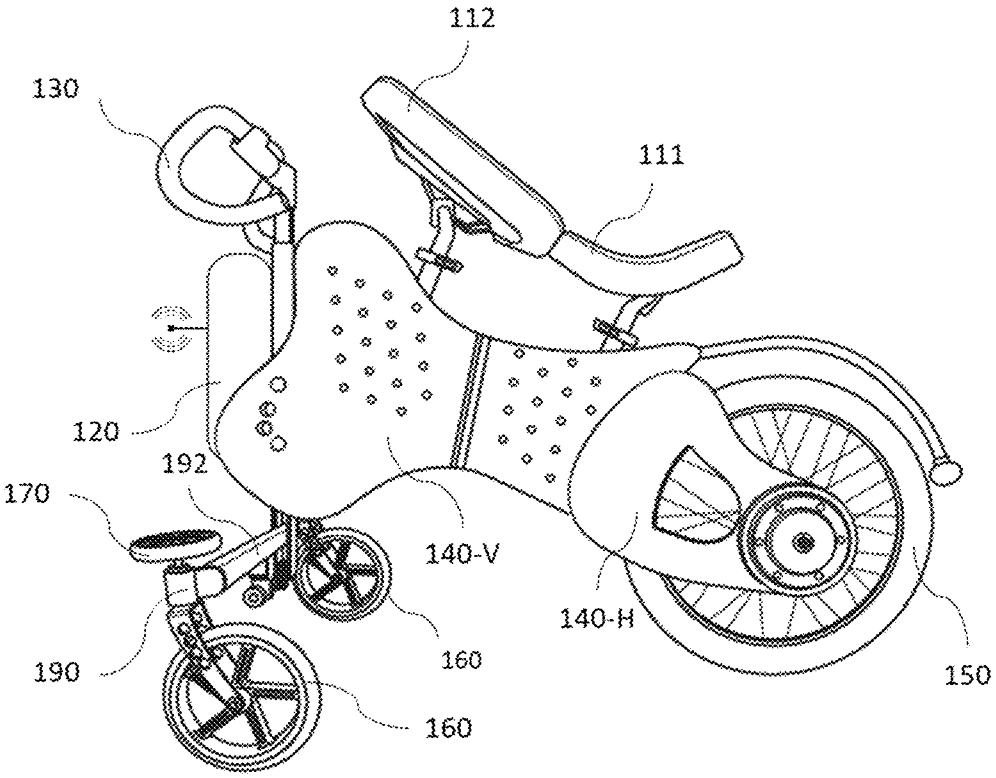

| | | | | |
|---|---|---|---|---|
| 6,675,820 | B2 * | 1/2004 | Balan | A61H 3/04 280/87.051 |
| 9,433,552 | B2 * | 9/2016 | Chang | A61H 3/04 |
| 10,251,805 | B2 * | 4/2019 | Morbi | A61G 7/1019 |
| 2015/0359699 | A1 | 12/2015 | Chang et al. | |
| 2017/0258664 | A1 * | 9/2017 | Purcell | A61H 3/04 |
| 2017/0273854 | A1 * | 9/2017 | Yu | A61H 3/04 |
| 2018/0178065 | A1 * | 6/2018 | Yu | A61H 3/04 |
| 2021/0059890 | A1 * | 3/2021 | Boyd | B62K 3/16 |
| 2021/0236022 | A1 * | 8/2021 | Shugert | A61B 5/1128 |
| 2021/0267838 | A1 * | 9/2021 | Kappl | A61H 3/04 |
| 2022/0212752 | A1 * | 7/2022 | Hunter | B62K 1/00 |

FOREIGN PATENT DOCUMENTS

| | | | |
|---|---|---|---|
| JP | 2015066025 | A | 4/2015 |
| JP | 2017029400 | A | 2/2017 |
| WO | 2021048847 | A1 | 3/2021 |

* cited by examiner

ADAPTIVE ROLLING WALKING DEVICE WITH SENSOR DATA ACQUISITION

1. TECHNICAL FIELD

The present disclosure relates to an adaptive rolling walking device for patients with a motor restriction, particularly for use in the therapy and diagnosis of such a person.

2. TECHNICAL BACKGROUND

Walking aids are used to support and treat patients with congenital, disease, accident, and/or age-related disorders of the human musculoskeletal system. These can be used for users with primary chronic disturbances of the motion apparatus as well as for users with acute and secondary chronic motor restrictions. Classic walking devices support the patient passively. However, walking aids are also already known from the prior art which are able to actively support a person limited in motor vehicles with the aid of sensor data.

In this context, an electrical wheelchair is known from the prior art, for example, from EP 3 197 414 A1, which is operated by sensor-supported control pads including force converters in order to generate a variable output signal proportional to a varying force. A control cross provides an analogue output that provides a variable speed signal to a controller to operate the wheelchair at a variable speed in both forward/reverse and right or left-hand curves.

Furthermore, an exoskeleton system is known from EP3 678 821 A1, comprising a first exoskeleton unit and a second exoskeleton unit for supporting a body part and control means, wherein the control means is configured to control the exoskeleton units based on a regulatory model, with the control model being based on a multi-body system, which models the exoskeleton units and a body part, and where the exoskeleton units are mechanically decoupled from each other.

Furthermore, particular sidewalks are known from the prior art which actively support persons with limited intellectual/motor properties with the aid of sensor data. For example, sidewalks are equipped with an integrated GMS modem and a GPS antenna, so that people suffering from dementia or disorientation can be located at any time by the position of the sidewalks. In addition, in support of Parkinson's disease, sidewalks can be equipped with sensors and a laser system based on an output of the sensor that the cane is in contact with the ground, triggering a laser signal to stimulate a parkinsonian to go.

However, the walking aids described above have the disadvantage that these aids merely compensate for deficits of mobility occurring in isolation. In addition, simple walking aids, such as sidewalks, do not provide immediate weight relief in the event of an acute disturbance of the gait, such as exhaustion, inciting spasticity and sending.

More complex walking aids, such as exoskeletons, have the disadvantage that the technology is very complex in application and adaptation, and therefore cannot be used realistically in everyday life. The use of such aids is usually only possible under optimal conditions for the user and the patient, and motion patterns are usually only depicted or evaluated for a short period of time. In addition, when using exoskeletons, limiting factors are usually in the areas of muscular tone, contractions, as well as torso and head stability, which exclude or at least significantly limit an application.

In addition, cognitive restrictions in the operation of walking aids by the user must also be taken into account. In particular, for people who are both motor and cognitive restricted, known walking aids do not support enough.

Thus, the present invention is based on the object of providing a walking aid that can be highly individually, easily applied and adjusted for users affected by a complex, which particularly simplifies the use in everyday life and the targeted adjustment of the individual therapy parameters and, in doing so, at least partially overcome the disadvantages of the prior art discussed above.

3. SUMMARY OF THE INVENTION

This problem is solved by the subject matter of the independent claims of the present invention. Examples of embodiments are described in dependent claims.

In one embodiment, the present invention provides a walking device for the therapy and diagnosis of a person with a motor restriction, wherein the walking device comprises: At least one axis and a plurality of wheels, a support device for the person configured such that the person may sit on the support device while using the walking device and simultaneously rest at least partially on the support device with the front of their upper body, and one or more sensors configured to generate sensor data associated with a therapeutic interaction of the person with the walking device.

In particular, it has become apparent that the therapy of patients with active-training, rolling walking devices as disclosed in WO 2020/020872 A1 and which, due to their novel mechanical construction, do not only support the patients in the movement but also treat or train their muscles and nervous system, by integrating such sensors, Which allow the therapeutic interaction with such a training walking device to be characterized, significantly improved.

The invention disclosed in WO 2020/020872 A1 also originates from the inventors of the present application. It is further stated that therefore, its content is completely incorporated here as if it was represented completely in the following.

In particular, such an arrangement allows a person with a motor restriction to use the rolling walking device as a walking aid and/or therapeutic device, while at the same time sensor data is detected which characterizes the patient's therapeutic interaction with the walking device. As elucidated in detail below, closed-loop therapy approaches can be implemented, in particular, in which therapeutic feedback can be given to the patient in real time and/or the mechanical and/or dynamic properties of the walking device and thus the patient's therapeutic interaction with the walking device can be adjusted in real time.

In addition, the sensor data generated can also be used for software, especially for machine learning support diagnostics, in order to optimally adapt, among other things, long-term therapy plans to the respective motor restriction of the patient. It has been shown that this can significantly improve the success of the therapy even during severe disease processes, and at the same time increase the acceptance of therapy and the joy of using the device, especially in children.

In particular, the walking device designed in this way can also be trained in patients who are only partially able to maintain upright posture, the muscles involved in walking and their coordination. Patients with a hip-length muscle strength value according to Janda greater than or equal to 3 can usually even use the walking device according to the invention on their own. In this way, the walking device can be used regularly in everyday life, whereby a permanent detection of sensor data can represent the actual restriction of the person in detail, and it is better possible to adjust the therapy and/or the walking device to the real physical restriction of the person.

For example, the invention allows patients to support and/or treat patients with one or more of the following motor restrictions: Reduced pelvis, torso and head control, lesion of the first motor neuron (spasticity); lesion of the second motor neuron (paralysis); Fixed contractions at the extremities; Simultaneous functional limitations of the upper and lower extremities.

Due to the fact that in such and similar limitations, the interaction of the respective patient with the walking device can be very different and varies considerably in time, the claimed invention allows the therapy and/or the therapeutic function of the walking device to be individually adjusted to the current interaction profile of the patient with the walking device. Furthermore, such an arrangement allows simultaneously generating patient motion data in real time and under real conditions, which otherwise could only be generated under laboratory conditions and under considerable effort. The sensor data may include information that allows assessing the therapeutic and/or diagnostic benefit of the person's interaction with the walking device.

Such information may include information on the individual activity profile and on the individual strain of the walking device. Capturing such information usually requires complex laboratory conditions. By using the accessory according to the invention, the effort, particularly the staff effort, significantly reduces.

The data regarding the user's individual activity profile or interaction with the walking device, respectively, recorded by means of the arrangement described above, allow for evaluation with regard to the user's behavior with regard to obstacles, such as objects or other persons, for example. For example, the data of the individual activity profile can provide information on specific, repeatedly occurring difficulties, such as obstacles, especially in an often frequented environment. This information can be used to specifically avoid or eliminate such difficulties. Furthermore, data on the individual load of the walking aid, which is generated by the use of the described walking device in everyday life, can be used in order to optimally adjust the walking device to the user individually.

In addition, the walking device may include one or more feedback devices designed to provide therapeutic and/or diagnostic feedback to the person who is preferably multisensory, or to stimulate the person's nervous system and/or muscles; And/or one or more actuators to influence the mechanical properties, the state of motion and/or the interaction of the person with the walking device.

The feedback medium allows the person to be given therapeutic and/or diagnostic feedback. Such feedback may be either mechanical-haptic or audio-visual. For example, the person may be motivated or motivated by a mechanical-haptic and audio-visual signal to perform certain movements more often or to at least obtain diagnostic information regarding movement sequences. In addition, one or more actuators can at least support the movement of the walking device, which can motivate the person to move as It is easier To Move. Such reward mechanisms are particularly suitable for motivating people with cognitive limitations or children to move.

The feedback, stimulation and/or influencing of the walking device and/or the interaction of the person with the walking device may also be based at least partially on the sensor data generated and/or wherein the feedback device provides haptic and/or mechanical feedback and/or wherein the feedback device is set up to stimulate the muscles of the person.

The feedback device can cause the walking device to provide feedback based on the sensor data to the person who assists them in therapy and/or diagnosis. For example, if the sensor data determined that the person is exhausted, an actuator can move the walking device independently or at least the person thereby helps to move the walking device. Such support can also be audio-visual, and/or by electro-stimulation of the muscles. The latter may be useful in people with severe cognitive restrictions. On the whole, a person can be motivated or instructed to make movement according to the situation by the arrangements/embodiments described here.

Alternatively or additionally, the walking device may further comprise a communication interface to transmit the sensor data to a data processing device which is configured to generate therapy data, therapeutic instructions and/or instructions to avoid obstacles from the sensor data, And/or to receive therapeutic instructions and/or instructions to avoid obstacles. By means of this arrangement, it is possible to transmit the sensor data detected/generated in real time to a data processing device. The data can then be used to provide information about the treatment history, Send Therapeutic instructions, such as updated therapy plans communicated via the feedback agent and the person, to the walking device, or create instructions that can help prevent obstacles in real time.

In some embodiments, the one or more sensors may comprise at least one of a speed sensor, an inclination sensor, a pressure sensor, an acceleration sensor, a sensor for measuring the position of the person's legs in relation to the walking device, a weight sensor or a sensor for detecting obstacles.

Such sensors allow extensive detection of the activity profile of the person as well as of the loading on the walking device by the person. For example, the speed sensor, tilt sensor, and acceleration sensor can detect the movement of the device. Pressure sensor, weight sensor and sensor for measuring the position of the person's legs in relation to the walking device can be used to determine the person's seat position or posture. Together with the sensor for detecting obstacles, it is thus possible to generate comprehensive information about the device, person and environment of the person. Due to the fact that one or more of these sensors are firmly integrated in the walking device, such data also becomes possible to detect such data during normal use of the walking device in everyday life. It is stated that this data may be transmitted to a data processing apparatus and evaluated immediately or at a later point in time.

The sensor for detecting obstacles may comprise at least one of a camera, an infrared sensor, a laser sensor, a radar sensor, or an ultrasonic sensor. Such sensors enable reliable visual detection of different complexity. Thus, these sensors may be used individually or in combination. Combining single sensors increases reliability, but also complexity. The advantages of infrared, laser, radar and ultrasonic sensors are that they can also be applied in low light conditions. Camera sensors, on the other hand, are usually less complex than alternatives and are easier/cheaper to implement.

In some embodiments, the walking device is furthermore arranged to lift and/or lower at least a section of at least one axis, preferably using electromechanical, hydraulic or pneumatic elements. Adjusting the height of sections of an axis allows precise adjustment of the slope and/or height position of the walking device. In addition, tilting of the person, if this is detected by the sensor data, can be actively prevented/prevented by influencing the electromechanical, hydraulic or pneumatic elements. For example, at least one of the elements can change the tilt of the walking device such that the body position/center of gravity of the person is changed so that the latter is moved to a stable position or that a harmful position detected by the sensors is changed.

Moreover, the tilting mechanism with restoring force described in detail in WO 2020/020872 A1 may be configured to the therapy requirements in real time via such actuators.

In some embodiments, the walking device may comprise a data processing device which is configured to generate therapy data for the person's therapy with a motor restriction from the sensor data and/or to control actuators and/or feedback devices, at least partially based on the sensor data and/or therapy data.

One advantage of such an arrangement is that the sensor data, in order to generate therapy data, does not first have to be sent to an external data processing device, but that it may be generated and processed directly on the walking device. This can speed up the generation of therapy data, making it easier to provide real-time support through updated therapy data. It is also possible to generate updated treatment data for the treatment of the person in remote locations. This allows the person to be optimally treated and/or supported at any time.

In some embodiments, the one or more actuators are configured to adapt one or more of: an inclination angle of the walking device, a position of the at least one axis of the device, a movement speed of the device, a tilting of the support device with respect to a surface on which the walking device rolls, a restoring force for tilting, a saddle height, a propulsion force and/or the shape of the support device.

Such actuators allow the walking device to be configured according to the situation. The walking device may, for example, be stabilized by adjusting the angle of inclination, which may prevent tilting, in particular in persons with severe physical limitations. The inclination angle can be adjusted statically, by previous configuration of the actuators, but also dynamically, in response to sensor data.

Changing the position of the at least one axis also allows adjusting the inclination angle, among other things. In addition, the direction of the walking device may be controlled if, for example, a person with cognitive restrictions does not, or is only limited in ability. Moreover, if an obstacle was detected, for example, setting the at least one axis can enable a deviation. On the other hand, if, for example, an oblique position is detected, it can be counteracted by changing the position of the axes, for example by reducing a roll on a side by changing the position of the axis. This will enable us to overcome smaller obstacles and overcome larger obstacles. Moreover, by adjusting the power of propulsion, gradients that are difficult to overcome, especially for people with strong motor restrictions, can be overcome. Changing the speed of movement allows the walking device to slow down or accelerate independently, that is, without any action by the person. If the position of the axes is adjusted at the same time, the deflection and/or crossing of obstacles can be improved.

Adjusting the ability of tilting the support surface can also help to improve the stability of the person on the walking device. Apart from these advantages, which were mentioned with regard to the inclination angle of the walking device, this allows the person from which at least one bearing surface is prevented to slip. In addition to orthopedic reasons, that is to say, in addition to an optimal adjustment of the device to the body structure of the person, the change in the saddle height can also have safety-relevant advantages. For example, if the walking device is detected to be tilted, satellite height can be reduced so that the center of gravity of the walking device is reduced and tilting can be prevented.

Further orthopedic adjustment possibilities result from the adjustment of the minimum one support device to the body structure of the person. For example, if the at least one support device has the shape of a seat, the leg width of the seat may be changed. In addition, individual sections of the support can be increased or decreased to provide an optimal fit or support position for the person. In some embodiments, the support device comprises a seat and at least an upper body support, which can be adjusted relative to each other.

This allows you to adjust the walking device to the height and/or posture and/or to adjust a patient's skeletal muscles. Such adjustability of the at least one support device particularly enables the walking device to adjust the patient's body position, which constantly improves upon the success of the therapy, for a longer period of time.

This also allows most patients to be unable to be attached to the walking device and to be able to enter the walking device independently or require little help from an untrained person. In some embodiments, the walking device includes a device for creating a virtual therapy environment that can be presented to the person.

An advantage of a virtual therapy environment is that it can be used to motivate children and/or persons with cognitive restrictions to train/therapy with the walking device and/or to stimulate specific movement sequences. Remote, a virtual therapy environment can have a video game character with a reward system that can motivate the person to perform therapy exercises over a longer period of time.

In some embodiments, the device for creating the virtual therapy environment is configured to change the virtual therapy environment based on the sensor data, add one or more virtual objects to the virtual therapy environment and/or adjust a position of a virtual object in the therapy environment.

By adjusting the virtual therapy environment to the sensor data, the person's therapy can be further improved. For example, a reward in the virtual therapy environment can be adjusted to perform therapy exercises correctly. In addition, the virtual therapy environment can be customized to provide feedback to the person to perform the exercises correctly. In an example, the person can be presented with a virtual therapy environment in which obstacles are placed that form a course that the person must avoid by steering movements. In another example, by Performing motion sequences, the person can influence objects in the virtual therapy environment that are part of a virtual scenario. This allows the person to be motivated to Perform therapy exercises in a playful manner.

In some embodiments, the virtual objects correspond to obstacles that are detected by means of the sensor data. By placing and Modifying objects in the virtual world based on sensor information, the real environment of the person can be integrated into the virtual therapy environment. This prevents the person from colliding with real obstacles when interacting with the virtual therapy environment. It can also increase immersion in the virtual therapy environment, which can also motivate people. Overall, this makes the virtual therapy environment more realistic. In some embodiments, the walking device further comprises a preferably multisensory display device for the virtual therapy environment.

A multi-sensory display enables the presentation of the virtual therapy environment to people of different cognitive abilities. For example, an audio-visual representation of the virtual therapy environment can be ideal for a person without, or with weak cognitive limitations. Only audio visual representation may not be sufficient for a person with a strong cognitive restriction. In this case, a mechanical-haptic signal or an electric stimulation can also help. The walking device can also be equipped with a residual power support device (e.g. a pulse-controlled electric motor in the rear wheel) and/or a controllable braking system.

4. BRIEF DESCRIPTION OF THE DRAWINGS

Figure 2:
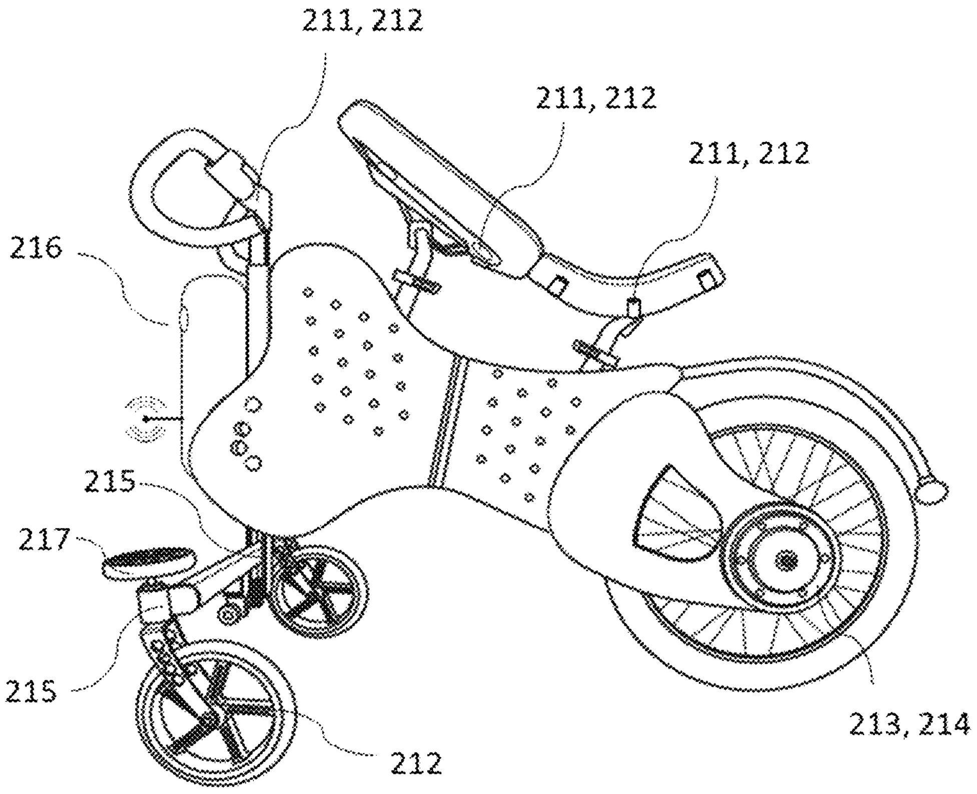
Figure 3:
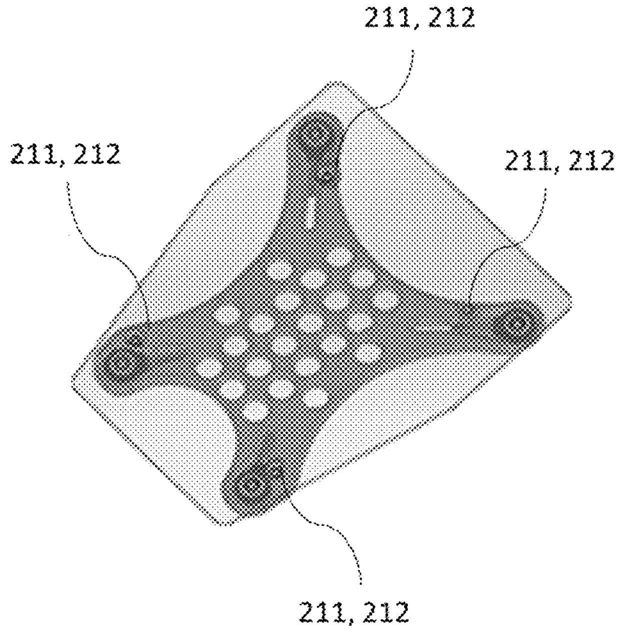
Figure 4:
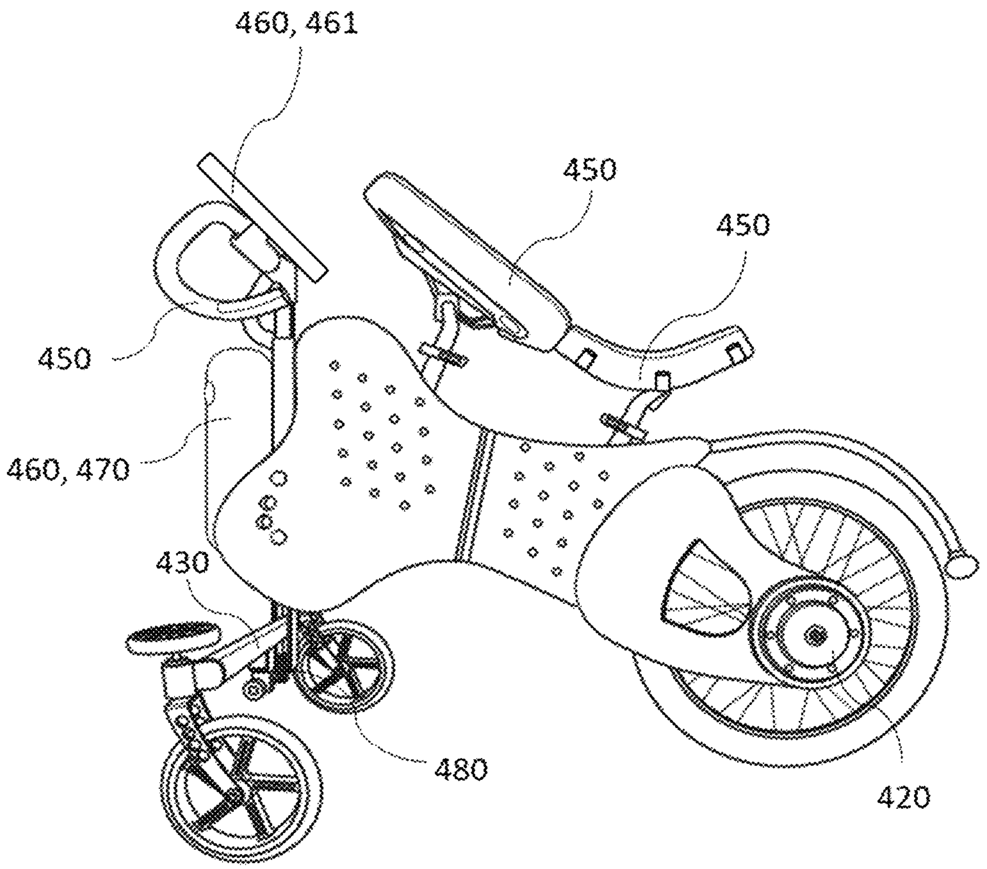
Figure 5:
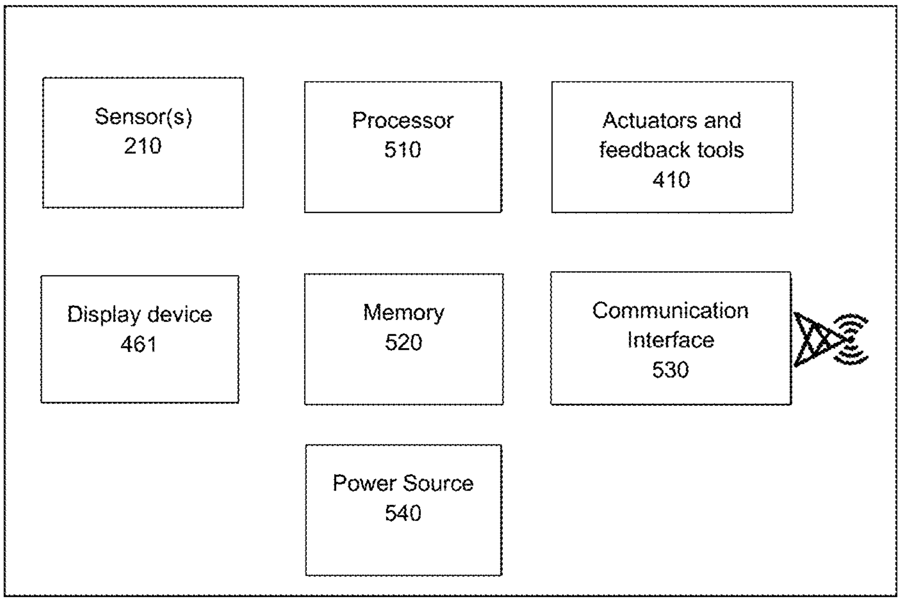
Figure 6:
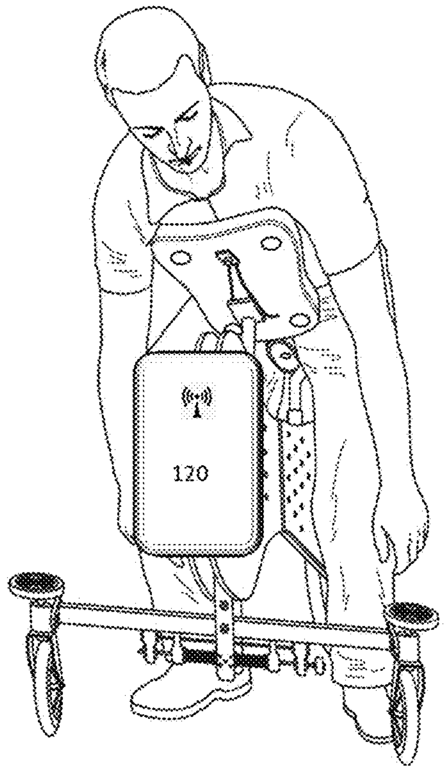
Figure 7:
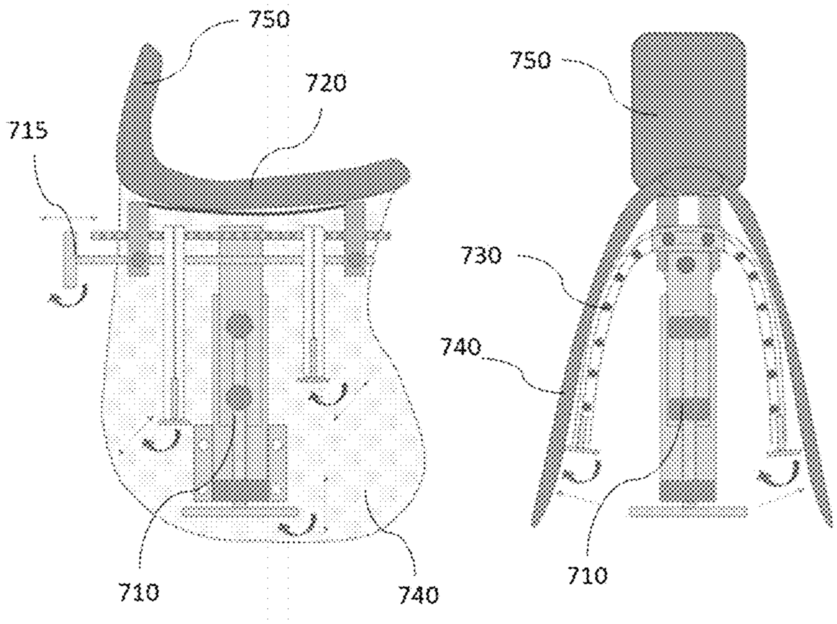
Figure 8:
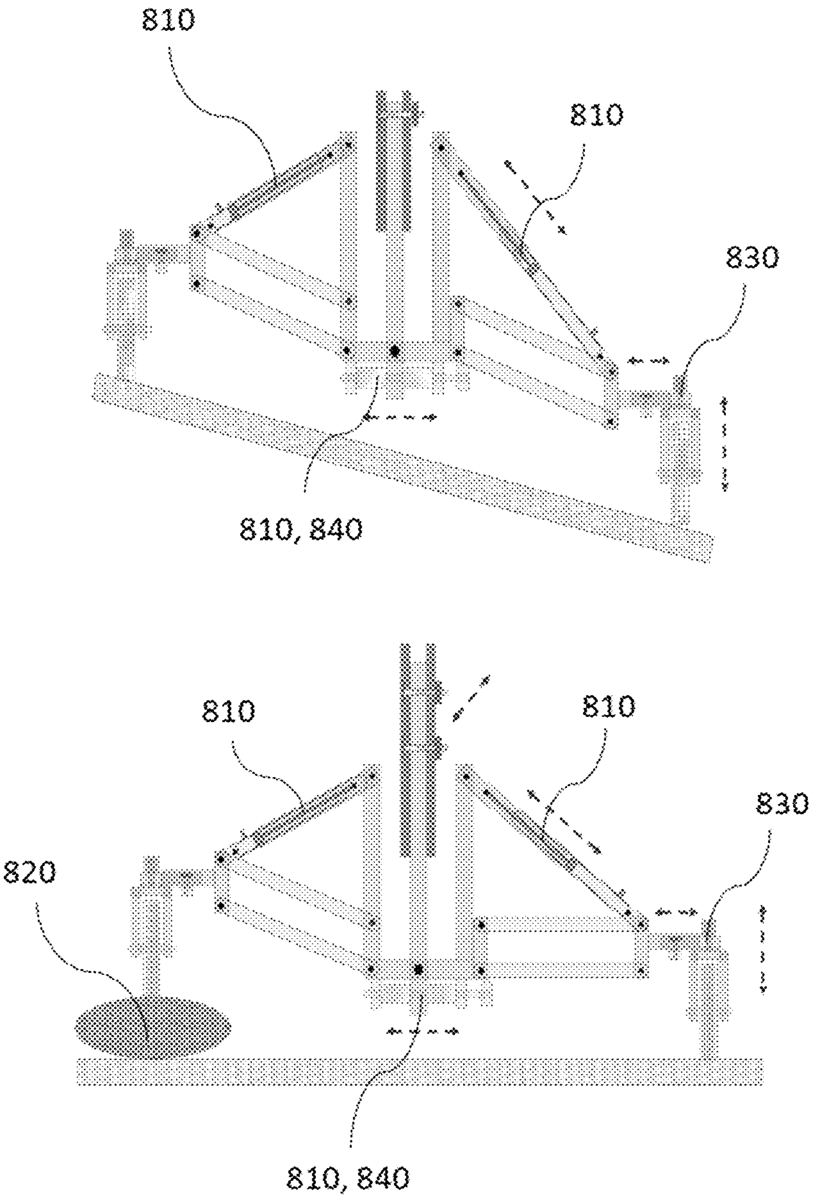
Figure 9:
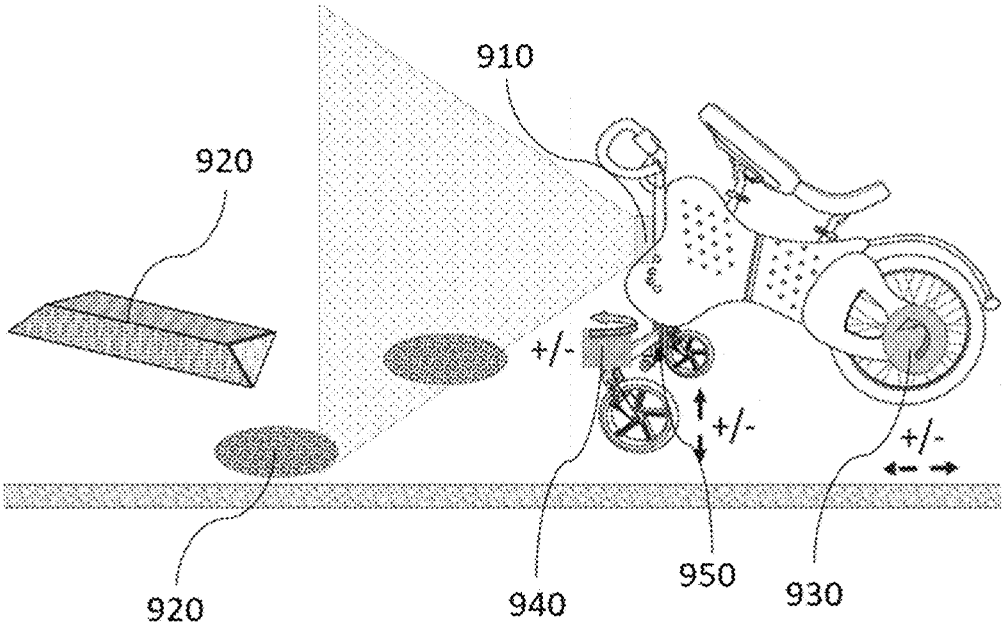

Certain aspects of the present invention will be described below with reference to the enclosed drawings. The drawings show:

FIG. 1 a side view of a walking device according to an embodiment of the invention;

FIG. 2 a side view of a walking device according to an embodiment of the invention including possible sensor positions;

FIG. 3 a support device with exemplary sensor positions according to an embodiment of the present invention;

FIG. 4 a side view of a walking device according to an embodiment of the invention including possible actuator positions;

FIG. 5 an exemplary embodiment of a data processing device of the present invention;

FIG. 6 a front view of a walking device according to an embodiment of the present invention during use;

FIG. 7 an adjustable, saddle-like support device according to an embodiment of the present invention;

FIG. 8 an adaptable axis arrangement according to an embodiment of the present invention;

FIG. 9 an embodiment of the accessory according to an embodiment of the present invention using a means for detecting obstacles and actuators;

5. DETAILED DESCRIPTION OF SOME EMBODIMENTS

Some embodiments of the present invention are described below. In this regard, different combination of features are described with reference to some exemplary embodiments of the present invention. A three-wheeled walking device with a large rear wheel and two smaller front wheels as well as a frame, a hand support, a seat and an upper body support is described below by way of example. However, the claimed walking devices are not limited to such embodiments. It is rather to be understood that other combinations of features can also fall within the scope of protection of the invention. In other words: Not all features of the described embodiments need to be present in order to implement the present invention. It is furthermore stated that embodiments can be modified by combining certain features of an embodiment with one or several features of another embodiment—to the extent to which they are technically sensible—without deviating from the disclosure and the scope of protection of the present invention. The invention is defined by the patent claims.

In particular, the present invention is not limited to three-wheeled walking devices having a rear wheel but can be applied to a person having a motor or cognitive restriction for a plurality of different rolling walking devices. The expression role and wheel are used equivalently in the context of the present invention. Furthermore, the term “essentially” in the context of the present invention has to be understood as “within typical design, construction, manufacturing and/or measurement tolerances”.

FIG. 1 shows a side view of a three-wheeled walking apparatus according to an embodiment of the present invention. The walking device comprises a seat 111 and an upper body support 112, which are independently of one another connected to the front part 140-V of a frame in the shown embodiments. The walking device comprises a seat and an upper body support, which are detachably connected to each other independent from one another. However, in other embodiments, the seat 111 and the upper body support 112 may also be integrated in a joint support device and/or further supporting elements (not shown) may also be attached to the frame 140 for the upper body and/or other body parts of the patient.

Moreover, both the seat 111 and the upper body support 112 of the embodiment shown in FIG. 1 are designed in a manner adjustable to one another in their height and/or position. It is also possible to change the position of the respective mounting point of the seat 111 and the upper body support 112 on frame 140 of the walking device. In some embodiments, the upper body support may also be mounted substantially perpendicular. As described in detail below with reference to FIG. 2 through FIG. 4, the walking device is, according to the present invention, equipped with sensors which it allows to generate sensor data, Associated with a patient’s therapeutic interaction with the walking device and allow characterizing this interaction for therapeutic and diagnostic purposes and using the sensor data for diagnostic purposes and improving neurological or motor therapy.

For this purpose, the walking device may comprise a data processing device 120, which may be configured to process sensor data of one or more sensors attached to the walking device (not illustrated in FIG. 1, see e.g. FIG. 2) and/or transmit them to an external data device. For example, the data processing device 120 may comprise a communication interface and transmit sensor data to an external device. Alternatively or additionally, the individual sensors may also be equipped with a data processing device and/or a communication interface. For example, the data processing device 120 may comprise a processor and/or a multi-purpose signal and data processing apparatus that performs calculations and/or initiates actions based on the sensor data. In some embodiments, the data processing device of the walking device may also be basically implemented in software that is, for example, carried out on an all-purpose computing device (e.g. a one-board computer or a smartphone) which may be removable on the walking device. A detailed description of exemplary sensors to be applied to the walking apparatus can be found below with reference to FIG. 2, FIG. 3 and FIG. 4. An exemplary data processing device 120 is described with reference to FIG. 5.

The rolling walking device of FIG. 1 comprises two eccentric front wheels 160 and a substantially centrally arranged rear wheel 150, which may comprise an electric motor for supporting the remaining power and/or a brake. The eccentric front wheels 160 are hinged to a wheel suspension 192 (and via the connecting rod to the frame 140) and stabilize the walking device against the overturning of the walking device. The pivot joints 190 improve the steering ability of the walking device, thereby reducing the minimum turning radius or turning circle that the walking device can roll. In a preferred embodiment, the wheels 160 are pivotable and removably connected to the wheel suspension 192 via pivot joints 190 such that the track width of the axis can be individually adjusted, for example by means of a plug system. Further details of the walking device shown in FIG. 1 are described in detail IN WO 2020/020872 A1.

FIG. 2 shows the exemplary walking device of FIG. 1 as well as a plurality of possible sensors which may be attached to the walking device in some embodiments. Sensors can be used to generate sensor data associated with a person's interaction with the walking device and can therefore be used to improve therapy and diagnose the person. Examples of sensors that can be applied to the walking device are one or several pressure sensors 211, weight sensors 212, speed sensors 213, acceleration sensors 214, inclination sensors 215, sensors for detecting obstacles 216 and collision sensors 217.

For example, weight and pressure sensors may be mounted in one of the support devices 111, 112 or also the hand support 130 (cf. FIG. 1) to detect whether a person is seated on the walking device. In particular, a plurality of attached weight and/or pressure sensors 212, 211 may be used for achieving an exact determination of the seat position by capturing the weight distribution via the support devices 111, 112 or the hand support 130.

An exemplary arrangement of four weight and/or pressure sensors in an exemplary upper body support 112 is shown in FIG. 3. By the uniform distribution of the weight and/or pressure sensors, information/data for the precise distribution of pressure or the load of the support devices 111, 112 and/or the hand support 130 can be determined. For example, it can be sensed which of the support device is mainly under load and/or whether a constant load occurs.

In addition, the walking device may include inclination sensors 215. They may be used to detect an inclination angle of the walking device. The data of the inclination sensors together with the information/data of the weight and/or pressure sensors form data for the individual load and for the static or dynamic configuration and/or the state of movement of the walking device. Such inclination sensors may, for example, be attached to a universal joint between the axis and the frame in order to detect data that allows the patient's hip instability to be indirectly characterized by measuring the lateral tilting. The inclination of the front wheels could also be measured, for example, to Characterize the straight-ahead running.

Such data can be used to detect a change in the restriction of the person. Data on the individual load of the walking device can also be used to optimally adjust the walking device individually to the person. For example, the data can be used for individually burdening the walking device in order to adjust the height of the seat of the walking device or to configure the axes of the walking device such that a tilt in one of the directions is impeded.

By making reference to FIG. 2 again, the walking device may further comprise speed sensors 213, acceleration sensors 214 and/or sensors for sensing the axis position. The speed and/or acceleration sensors 213, 214 can be used for detecting a speed of movement and/or an acceleration of the walking device. Together with data from the sensors for acquiring the axis position and/or the data from the inclination sensors 215, the data of the speed sensors and/or acceleration sensors can be used for generating motion data and/or a dynamic motion profile of the walking device. The motion data of the walking device can provide information on the speed and acceleration of the walking device, but also on the direction of the motion of the walking device. Moreover, the motion data of the walking device may provide information on the slope (with a negative or positive slope) of the underground on which the walking device is moving. For example, the slope of the base can be used together with data from pressure sensors in the slide bar to determine from the motion data of the walking device how much the person's own share in the movement of the walking device is. Thus, the movement data of the walking device can be used to generate comprehensive information about the current movement of the walking device and the person's own share of the motion.

The sensors mounted on the walking device cannot only be used to detect the user's seat position on the walking device or to detect movement of the walking device but are also used to detect obstacles in the vicinity of the walking device.

For example, collision sensors 217 and sensors for detecting obstacles 216 can be applied to the walking device to sense obstacles to the walking device. Exemplary sensors for detecting obstacles are a camera, an infrared sensor, a laser sensor or an ultrasonic sensor. The sensors for detecting obstacles 216 can be arranged such that they generate a full image of the environment around the walking device. Preferably, the sensors are at least arranged such that obstacles detected before the walking device are detected.

In some embodiments, detection of the entire surrounding of the walking device is only possible in a limited manner. This may particularly be the case if the computing and/or memory capacities of the data processing device 120 are limited. To optimize data processing, the data processing device 120 may determine a prediction about a probable future path of movement of the walking device based on the motion data of the walking device. Based on the prediction, the sensors for detecting obstacles 216 can be configured such that only data is collected and evaluated in the likely future path of movement. Therefore only obstacles are detected which, for example, have to be traversed in order to avoid a collision, which can reduce the required computing power and the required memory requirement.

FIG. 4 shows an exemplary arrangement of actuators and feedback devices on/on a possible embodiment of the walking device. For example, the walking device may comprise means for adjusting the speed of movement 420. Such means may be an electric motor, such as a hub motor, for example. For example, if, based on the sensor data, it was determined that a person does not sufficiently contribute its own share to Moving the walking device, an electric motor may, for example, be controlled such that the walking device moves forward. Furthermore, if the motion data of the walking device determines that the person's own share decreases with the time, which causes exhaustion of the person to be determined, the electric motor may be controlled such that the person is supported. In addition, the person can be constantly assisted in the movement, preventing too Much Of the person From Becoming Exhausted. If the data processing device 120 determines that a collision is encountered with an obstacle, the data processing device 120 may further cause the motion motor 420 to reduce the speed of movement or to accelerate, i.e. decelerate, in the opposite direction.

The walking device may also comprise means/actuators for adjusting an axis position 430 (see also FIG. 7 below). The means for adjusting an axis position 430 is set to change the position of at least one axis and/or to change an angle of an axis or part of the axis. For example, if it was determined in the previous example that a collision can be prevented by a steering maneuver, the means for adjusting the axis position 430 can be controlled to change the axis position such that the obstacle is bypassed.

In addition or alternatively, the walking device may, in other embodiments, include means for adjusting a slope of the walking device. For example, if, based on the data on the walking device's individual load, it is determined that the person is in an oblique position on the walking device, the means to set a slope of the walking device may be excited to move the person in the opposite direction, thereby lifting or reducing the oblique position. In addition or alternatively, the tilt based on the data regarding the individual load of the walking device can be adjusted such that it is possible to prevent the person from slipping off the walking device.

In further embodiments, the walking device may additionally or alternatively comprise haptic feedback device 450. Haptic feedback devices can be a means of triggering an electric stimulation and/or an actuator for triggering a vibration, such as a vibration motor. Such haptic feedback devices are preferably mounted in the hand support and/or the support devices 111, 112. The haptic feedback devices allow the person to receive information from the walking device and thus improve the success of the therapy.

In addition to the haptic feedback devices, the walking device can also comprise visual feedback devices, either in addition or as an alternative. Examples of visual feedback devices may be a display device 461 or an illumination means. The display device 461 may be mounted on the data processing device 120 as a part of the data processing device 120 and/or be a separate display, as for example shown in FIG. 4. The display device 461 allows the person to obtain information from the walking device. For example, detected obstacles or the likely future path of motion can be illuminated and/or displayed by the visual feedback device.

The walking device may also comprise acoustic feedback devices 470. Examples of acoustic feedback devices are means for triggering a vibration and/or loudspeaker. As already described for the haptic feedback device and the visual feedback device, the person's acoustic feedback device can provide clues. Together with the visual feedback devices, the acoustic feedback devices generate audio-visual feedback.

With reference to the embodiments described above, a therapy arrangement according to an embodiment of the present invention, comprising the walking device and an external data processing device, is described below. Data may be transmitted via a communication interface via a communication device in the data processing device 120 of the walking device. The data received in this way may be retrieved and/or evaluated and/or processed and/or used at the external data processing device.

For example, a therapist may read sensor data from the external data processing device and use it for therapeutic purposes, which were detected, possibly pre-processed, and stored on the walking device at which the person used the walking device in everyday life. In a further example, a therapist may read the collected sensor data from an external data processing device and, based on said data, optimally adjust the walking device to the requirement by the person using the walking device. In another example, diagnostic data can be evaluated to read the status of the monitor. The data generated by the walking device can be transferred and stored to a storage device, such as a server or any other suitable storage medium.

In addition, data may also be transmitted from the external data processing device to the data processing device 120 of the walking device. Such data may include therapy plans, therapy instructions, virtual scenarios and/or software updates, such as firmware updates.

In a further example, a therapist can create a therapy plan based on sensor data that was transmitted to the external data processing device at an earlier point in time and transfer it to the data processing device 120 of the walking device. For example, this therapy plan may include instructions for feedback devices to reconfigure the feedback device(s). For example, if, based on the sensor data, it was detected that the person reacts better to the first feedback than to the second feedback, the first feedback may be given more frequently and/or the second feedback may be given less frequently. If, based on the sensor data, it is detected that the person does not respond well to the first feedback or the second feedback, third feedback and/or fourth feedback can be given more frequently and the first and second feedback can be given less frequently. For example, if, based on the sensor data, it is detected that a first exercise/therapy exercise causes a specific effect, the first exercise may be triggered by the walking device more often than a second exercise that achieves the desired effect less.

On the other hand, if it was detected based on the sensor data that the first exercise does not achieve the achieved effect, the second exercise or a third exercise can be triggered more frequently than the first exercise. Exercises with the walking device can be varied. An example of an exercise can be transmitted to the person by audio visual or mechanical-haptic feedback, which motivates/prompts the person to make a particular movement. For example, instructions to the person may be displayed on a display means. It is also possible to use mechanical-haptic signals and/or electric pulses to initiate or announce certain exercises.

In particular, exercises can also be conducted unnoticed by the person. Thus, during normal use the walking device may trigger a targeted tilt of the walking device or reduce power support, which causes the person unconsciously moved to compensate the self. This can be beneficial, especially in children or people with cognitive limitations who are often unable to concentrate over a longer period of time or who are unmotivated to do targeted therapeutic exercises.

In addition, if one or several sensors of the walking device have detected that a configuration of one or more actuators leads to an undesired action, an updated configuration of the one or more actuators can be transmitted to the data processing device 120 of the accessory via the external data processing device. For example, based on the configuration of one or more of the actuators, it can be detected that the walking device is tilted too strongly/too weak or too slow/jerky or fast, for example, so that this inadvertently affects the person using the walking device. In addition, it can be detected that, for example, the residual power support, or acceleration is too strong/too weak, which also has a negative effect on the person using the walking device. In particular, due to an incorrect configuration/calibration of the actuators, the person may experience dizziness.

Furthermore, software or firmware updates, respectively, of the actuators or other electronic components, such as the data processing device 120 of the walking device may be updated and/or modified via the external data processing device. In this way, additional functions of the walking device can be implemented and/or optimized afterwards.

In a further embodiment, all steps described in the above exemplary applications with reference to FIGS. 1-FIG. 4 may also be performed locally on the data processing device 120 of the walking device. These may be carried out independent or in addition to being carried out on the external data processing device.

An advantage of carrying out processing of the data on the data processing device 120 of the walking device, That by this it is possible to spontaneously react to surrounding effects or user inputs at any time and to generate instructions described above also independent from therapists or other persons at any location/at any time and to be provided to the person who uses the walking device.

FIG. 5 shows an exemplary data processing device 120 of the walking device. The data processing device comprises at least one processor 510. It may be used to process sensor data locally on the data processing device 120. In particular, the processor can be used to perform the processing step described above locally on the walking device. For example, the processor can run firmware used to control the device through sensors/actuators/feedback devices, and to collect sensor data. Furthermore, the processor may receive sensor data from the sensors and transmit them to an external data processing device by means of a communication interface, such as an LTE, 5G and/or a Bluetooth interface. Alternatively or additionally, the processor can process the sensor data itself and generate therapy and/or diagnostic data based on it and/or read and/or control sensors/actuators/feedback devices. The data processing apparatus furthermore comprises at least one memory 520, in which the firmware or other software components may be stored, for example. Some of the above with reference to. FIG. 4 described display means/devices and/or actuators and feedback devices may be integrated into the data processing device in some embodiments and/or be functionally connected to it, for example via a wireless communication interface such as Bluetooth.

Particularly, a walking device, as is known from WO 2020/020872 A1, can be equipped with the required sensor technology by universally applicable receptacles of the palm rest, the breast support and the saddle. Therefore, the present invention is based on sustainability and cost reduction in health-care systems as the central design idea. This approach, particularly in the field of outpatient application, entails a considerable reduction in costs. Adapters fitted as standard on The Allow For The Mounting of inclination and/or acceleration sensors and/or distance measurement (e.g. for easy tracking).

The possibilities for the application of sensors are manifold, e.g. on the base frame, on the measuring components (saddle, chest, handle) and/or directly on the user. First tests by the inventors have shown that the following sensors in particular can significantly improve the therapy: An inclination sensor in the oscillation axis, a 4-way pressure sensor breast support, a semi-pressure sensor, a speed sensor and/or a distance measurement sensor. Through direct feedback, the sensor system provides the user with control over the pressure/load conditions on the walking device and communicates directly with a server online and in real time.

As shown in FIG. 6, a hand support 130 on the walking device can be done without if the body and the head are checked well. Without a hand support 130, however, it may be difficult for the person to steer the appliance, especially when both hands are used for the transport of objects or when bimanually activities are carried out. By supporting the chest and saddle areas, the walking device enables manual activities in particular. Especially in such cases. In particular in such cases, supporting the movement of the person by actuators, such as in particular by means for adjusting the speed of movement 420, means for adjusting the axis position 430, or means for adjusting a slope of the walking device, is helpful.

The variable and expandable sensor technology, as described above, offers many possibilities for data collection and for controlling both the walking device and further components, such as a display for augmented-reality or virtual-reality-based training scenarios. For example, the pressure load in the gear cycle can be graphically represented and thus used for the following purposes: The adaptation of the device, for personal feedback and for training purposes under controlled conditions such as a specific relief of an extremity without support from the upper extremities.

The data can also be stored, and training sequences documented. Gait analytical data can be acquired without a gangland under real conditions. By standardizing the data, comparable Collective can be formed and compared inter- and intra-personally. Furthermore, almost all degrees of severity of motion restrictions can be made measurable, even those that do not meet the demands of a gait lab. No spatial and temporal limitation of measuring intervals is required. Application data can be collected over a long period of time and motion and activity profiles can be created in everyday life.

Structural changes (e.g. due to spasticity) may be detected early by changing the load parameters. Furthermore, control of the walking device is made possible by detection of arbitrary/unconscious user parameters, such as braking the walking device, e.g. if the user is tired or if the walking device controls the environment, e.g. if light is switched on when entering a room, etc.

The integration of environmental sensors enables the crossing and/or escape of obstacles, an inclination measurement enables an inclination compensation which allows a tilt protection in the terrain and/or a track adjustment when Crossing doors and/or a warning of danger. Furthermore, as described In Detail above in section 3, the obtained data may, for example, be used in real time by a control in the field of augmented reality or virtual reality for motivation and for training purposes. Self-learning systems can also be implemented which adapt to the individual user.

It is also possible to report vital signs of the patient (e.g. cardiac circulatory activity via hand pads or a separate sensor, such as a smartwatch). This allows the training program to be configured, both in real and in the area of virtual/augmented reality.

It is possible to control medical devices, such as electrical muscle stimulators. A worldwide collection of data opens up new possibilities for the development of therapy concepts (Big Data) in the field of research. Through networking, consultations can be conducted online by evaluating the telemetry data. In the context of the early and very early rehabilitation in the field of intensive care medicine, communication and adaptation with vital-preserving devices (e.g. a ventilator) is possible and thus offers the earliest possible rehabilitation.

FIG. 7 shows a part of an optional embodiment in which a saddle adjustable to the muscle tone of the person with a diagnostic capability, e.g. the pressure load, is used instead of a seat device as described above. The new saddle comprises a height-adjustable saddle support 710, which can be individually adjusted to the patient under load. A clamping device 715 in the longitudinal direction of the saddle regulates the hardness of the seat surface 720, but also the width of the seat support by changing the kinking of the seat surface.

Transverse, rigid backward chains 730 allow the extraction to be reinforced in the seat-far portions of the saddle sheets 740. These chains can be moved forward and backward via two parallel suspension rods. Thus, the induction in the gear cycle can be individually configured to the user/patient, especially at the beginning of the step initiation. An exhibit or attachment surface 750 is arranged in the rear of the saddle, which additionally stabilizes the patient's pelvis dorsal and prevents slipping backwards over the saddle.

In some embodiments, the saddle shown above as an example may comprise different sensors. For example, pressure sensors can be fitted in several places, in particular to allow the detection of the following parameters: The total load of the saddle, the pressure on the reduction sheets in the front or rear section and/or, the pressure on the rear exhibit. The acquisition of these parameters is important, among other things, for the assessment of the load transfer to the lower extremities and for the assessment of the active stabilization of the pelvis.

Such a saddle, for example, can prevent a reduction in the crossing of the legs of the waist-reducing muscles at the place of origin (e.g. in case of spasticity). In addition, such a saddle allows the measurability of therapy measures or interventions such as, for example, treatment with botulinum toxin, oral tonus-regulating medication, operative interventions, etc.

FIG. 8 shows a further optional embodiment or further development, in which a flexible front axle is used for improving both terrain capability and tilting torque in combination with environmental sensor technology. In this regard, the sensors can recognize the ground tilt and/or obstacles (see FIG. 9). In response, the front axle of the walking device can be adjusted, e.g. by electro-mechanical, hydraulic and/or pneumatic actuators 810, which can be mounted at different positions on the walking device, to compensate for the ground tilt and/or to overcome obstacles 820. Alternatively or additionally, the residual force support (see FIG. 4) may also be configured. Moreover, in some embodiments, the pivot joints of the front-axle wheels may be stabilized by a suitable actuator 830, such as a viscosity-adjustable ferrofluid chamber and/or the restoring force of the tilting mechanism be adjusted via a further actuator 840, also to adapt the therapy parameters.

FIG. 9 illustrates how the functions described above with reference to FIG. 8 can be used to apply the walking device for therapy and/or diagnosis also in difficult environments. Environmental sensors 910 allow obstacles and/or changes to be detected in the underground 920 and appropriate countermeasures or support measures to be carried out, Such as, for example, an increase/reduction of the propulsion force 930, an increase/reduction of the rotational stabilization 940 and/or an increase/reduction of the axle tilting or the axis position and/or the restoring force of the tilting mechanism 950. In this way, the walking device described above can be used not only in indoor or similar environments for therapy and diagnosis, but also, with the same security, in normal and particularly therapy-supporting environments such as playgrounds or forest paths. In further embodiments, this arrangement can also be combined with the further sensors and/or feedback devices described above, e.g. in order to also inform the patient about changes in the surroundings and/or possible dangers.

The invention described above offers physicians and therapists the first possibility of analyzing the patient by the application of such walking devices. In this regard, the invention can be briefly used in therapeutic setting, but also provide data in the scope of a long-term application. It is difficult to obtain data on movement and activity patterns in everyday life, and especially for difficult users at the current time is almost impossible. The present invention thus provides completely new data on mobility and the success of rehabilitative measures in everyday life. The user can be given immediate feedback, but also objective feedback over the course of the process. Training plans can be individually configured and monitored. Changes in motion dynamics can be detected at an early stage. A field adjustment/continuity can be planned specifically according to the activity pattern. The user does not have to carry sensors on the body. The collection of large amounts of data through publicly accessible platforms and the subsequent evaluation of data in longitudinal and cross-sectional areas is showing enormous potential in mobility research, field adaptation and mobility prevention. The users of the present invention will experience a high disadvantage-side compensation especially of a direct or indirect environmental control or modification.

LIST OF REFERENCE NUMBERS

111 Seat
112 Upper body support
120 Data processing device
130 Hand support
140 Frame
140-V front
140-H rear section
150 Rear wheel
160 Front wheels
170 Deflector rollers
190 Pivot joints
192 Wheel suspension
211 Pressure sensor
212 Weight sensor
213 Speed sensor
214 Acceleration sensor
215 inclination sensor
216 Sensor for detecting obstacles
217 Collision sensor
420 means for adjusting the speed of movement
430 means to adjust an axis position
450 haptic feedback device
460 visual feedback
461 Display device
470 acoustic feedback
510 Processor
520 Memory
530 Communication interface
540 Power source/battery
710 Saddle support
715 Clamping device
720 Seat Base
730 backward chains
740 Saddle sheets
750 exhibit or attachment surface
810, 840 actuators for changing the axis configuration
820 Obstacle
830 Actuator for changing the joint rotation
910 Environmental Sensors
920 Obstacle
930 Propulsion Actuator
940 Joint Rotation Actuator
950 Axis Actuator

What is claimed is:

1. A walking device for therapy and diagnosis of a person with a motor restriction, the walking device comprising:

at least one axis and a plurality of wheels;

a support device for the person, which is configured such that the person can sit on the support device while using the walking device and simultaneously rest with the front of their upper body at least partially on the support device;

one or more sensors which are configured to generate sensor data associated with an interaction of the person with the walking device;

one or more feedback devices configured to provide multi-sensory therapeutic and/or diagnostic feedback to the person; and a device for creating a virtual therapy environment which can be presented to the person via a display device of the walking device or a separate display device, wherein the device for creating a virtual therapy environment is configured, based on the sensor data, to change the virtual therapy environment to add one or more virtual objects to the virtual therapy environment, and/or to adapt a position of a virtual object in the therapy environment.

2. The walking device according to claim 1, wherein the sensor data comprises information which allows assessing the multi-sensory therapeutic and/or diagnostic feedback to the person.

3. The walking device according to claim 1, wherein the one or more feedback devices are further configured to stimulate the nervous system and/or the muscles of the person; wherein the walking device further comprises:

one or more actuators to influence mechanical properties, a state of movement and/or the interaction of the person with the walking device.

4. The walking device according to claim 3, wherein the feedback and/or the interaction of the person with the walking device are at least partially based on the generated sensor data; and/or wherein the feedback device provides haptic and/or mechanical feedback; and/or wherein the feedback device is configured for electric stimulation of the muscles of the person.

5. The walking device of claim 1, further comprising:

a communication interface configured to transmit the sensor data to a data processing device configured to generate therapy data, therapeutic instructions and/or instructions to avoid obstacles from the sensor data; and/or to receive therapeutic instructions and/or instructions to avoid obstacles.

6. The walking device of claim 1, wherein the one or more sensors comprise at least one of a speed sensor, an inclination sensor, a pressure sensor, an acceleration sensor, a sensor for measuring the position of the person's legs in relation to the walking device, a weight sensor or a sensor for detecting obstacles.

7. The walking device of claim 6, wherein the sensor for detecting obstacles comprises at least one of a camera, an infrared sensor, a laser sensor, a radar sensor or an ultrasonic sensor.

8. The walking device of claim 1, wherein the walking device is further configured to lift and/or to lower at least a section of at least one axis using electromechanical, hydraulic and/or pneumatic elements.

9. The walking device of claim 1, further comprising a data processing device which is configured to generate therapy data from the sensor data for the therapy of the person with the motor restriction and/or to control actuators and/or feedback devices, at least partially based on the sensor data and/or therapy data.

10. The walking device of claim 1, further comprising:

one or more actuators to influence mechanical properties, a state of movement and/or the interaction of the person with the walking device, wherein the one or more actuators are configured to adapt one or more of: an inclination angle of the walking device, a position of the at least one axis of the device, a movement speed of the device, an ability of the supporting device to tilt with respect to a surface on which the walking device rolls, a restoring force for tilting, a saddle height; a propulsion force and/or a shape of the support device.

11. The walking device of claim 1, wherein the support device comprises a seat and an upper body support which can be adjusted relative to one another by means of controllable actuators.

12. The walking device according to claim 1, wherein the virtual object corresponds to obstacles detected by means of the sensor data.

13. The walking device according to any one of claims 1 or 12, further comprising a multisensory display device for the virtual therapy environment.

14. The walking device of claim 1, wherein the support device is further configured such that the person can sit on the support device while using the walking device and simultaneously rest with the head of the person at least partially on the support device.

* * * * *